United States Patent
D N et al.

(10) Patent No.: US 11,929,987 B1
(45) Date of Patent: Mar. 12, 2024

(54) PRESERVING PACKET FLOW INFORMATION ACROSS BUMP-IN-THE-WIRE FIREWALLS

(71) Applicant: Juniper Networks, Inc., Sunnyvale, CA (US)

(72) Inventors: Pranavadatta D N, Bangalore (IN); Aniket G. Daptari, San Jose, CA (US); Carlo Contavalli, Redwood City, CA (US); Prasad Miriyala, San Jose, CA (US); Kiran K N, Bangalore (IN); Prasannaa Vengatesan T S, Bangalore (IN); Venkatesh Velpula, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 451 days.

(21) Appl. No.: 16/800,816

(22) Filed: Feb. 25, 2020

(51) Int. Cl.
| | |
|---|---|
| *H04L 9/40* | (2022.01) |
| *G06F 9/455* | (2018.01) |
| *H04L 49/25* | (2022.01) |
| *H04L 61/5007* | (2022.01) |
| *H04L 69/22* | (2022.01) |

(Continued)

(52) U.S. Cl.
CPC ...... *H04L 63/0272* (2013.01); *G06F 9/45558* (2013.01); *H04L 49/25* (2013.01); *H04L 61/5007* (2022.05); *H04L 69/22* (2013.01); *H04L 69/324* (2013.01); *G06F 2009/45595* (2013.01); *H04L 2101/622* (2022.05)

(58) Field of Classification Search
CPC . H04L 63/0272; H04L 49/25; H04L 61/2007; H04L 69/22; H04L 69/324; H04L 61/6022; G06F 9/45558; G06F 2009/45595
See application file for complete search history.

(56) References Cited

U.S. PATENT DOCUMENTS

| 8,332,948 B2 * | 12/2012 | Zuk ..................... H04L 63/1416 726/13 |
| 9,590,820 B1 * | 3/2017 | Shukla .................... H04L 45/64 |
| 11,223,494 B2 * | 1/2022 | Mishra ................ H04L 12/4641 |

(Continued)

FOREIGN PATENT DOCUMENTS

WO  2013184846 A1  12/2013

*Primary Examiner* — William G Trost, IV
*Assistant Examiner* — Abdelbasst Talioua
(74) *Attorney, Agent, or Firm* — Shumaker & Sieffert, P.A.

(57) ABSTRACT

Techniques are disclosed for a network device to preserve packet flow information across bump-in-the-wire (BITW) firewalls. For example, a method comprises receiving, by a network device, a packet. The method also comprises determining, by the network device, that the packet matches a packet flow that is associated with an action to redirect the packet to a firewall configured as a bump-in-the-wire. The method further comprises, in response to the determination: modifying, by the network device, a Media Access Control (MAC) address field of a layer 2 (L2) packet header with a flow identifier of the packet flow; sending, by the network device, the packet to the firewall; receiving, by the network device, the packet from the firewall; and recovering, by the network device, the packet flow by modifying the packet according to the flow identifier in the packet to restore the L2 packet header of the packet.

20 Claims, 5 Drawing Sheets

(51) Int. Cl.
*H04L 69/324* (2022.01)
*H04L 101/622* (2022.01)

(56) References Cited

U.S. PATENT DOCUMENTS

| | | | | |
|---|---|---|---|---|
| 2005/0091396 | A1* | 4/2005 | Nilakantan | H04L 45/04 |
| | | | | 709/232 |
| 2013/0339516 | A1* | 12/2013 | Chauhan | H04W 4/18 |
| | | | | 709/224 |
| 2015/0124608 | A1* | 5/2015 | Agarwal | H04L 47/122 |
| | | | | 370/235 |
| 2016/0205041 | A1* | 7/2016 | Lee | H04L 47/828 |
| | | | | 709/226 |
| 2016/0337236 | A1* | 11/2016 | Hsu | H04L 61/103 |
| 2017/0257313 | A1* | 9/2017 | Helén | H04L 45/66 |
| 2018/0212818 | A1* | 7/2018 | Ide | H04L 43/026 |
| 2019/0306086 | A1* | 10/2019 | Boutros | H04L 49/30 |
| 2021/0084010 | A1* | 3/2021 | Alharbi | H04L 63/0263 |
| 2021/0218587 | A1* | 7/2021 | Mishra | H04L 61/2596 |
| 2021/0218774 | A1* | 7/2021 | Mittal | H04L 63/20 |

* cited by examiner

PRESERVING PACKET FLOW INFORMATION ACROSS BUMP-IN-THE-WIRE FIREWALLS

TECHNICAL FIELD

This disclosure generally relates to computer networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of the data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various hosting facilities.

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization with large scale data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Security devices, such as firewalls, provide network security for a network or data center. In some instances, a firewall is hosted on a network device or virtual execution element (e.g., virtual machine or container) to control incoming and outgoing packets according to one or more rules (e.g., policies). These firewalls may be referred to as host-based firewalls.

In some examples, a host-based firewall is configured as a Bump-in-the-Wire (BITW) firewall. A BITW firewall is configured with an interface to receive a packet and an interface to output the packet after one or more policies of the firewall are applied to the packet. In general, the interfaces of a BITW firewall do not require any packet reconfigurations. That is, as packets flow through a BITW firewall, the firewall does not modify layer 2 headers of the packets as polices are applied to the packets. An advantage of using BITW firewalls is that these firewalls are integrated into a network without needing any configuration changes to existing devices connected to the firewall. For example, a firewall of a network device may only support up to layer 4 of the Open Systems Interconnection (OSI) model. The network device may redirect packets to a BITW firewall that supports up to layer 7 of the OSI model. In this way, without requiring changes to the network device, a BITW firewall is used to provide support for layer 7 policies that is otherwise not supported by the firewall of the network device.

SUMMARY

In general, the disclosure describes techniques for a network device to preserve packet flow information across bump-in-the-wire (BITW) firewalls. For example, a network device, such as a provider edge (PE) device (e.g., router, switch, virtual router), processes incoming packets according to a packet flow. For instance, when a router receives a packet, the router examines information included in the packet, such as a 5-tuple (e.g., source address, destination address, source port, destination port, protocol) to determine a flow for the packet. As part of a particular the flow, the router may be configured to redirect the packet to a firewall that provides security for the application layer (e.g., layer 7 (L7)) because, for example, the firewall of the router may only provide security up to layer 4 (L4) and the particular flow has been designated for additional security services provided by the L7 firewall. The L7 firewalls are typically referred to as next-generation firewalls (NGFWs). In some examples, the L7 firewalls are configured as a bump-in-the-wire such that the BITW firewall does not perform any packet reconfiguration when forwarding the packet out an outbound interface associated with a physical link. In accordance with the techniques described in this disclosure, the router may replace a Media Access Control (MAC) address field of a layer 2 (L2) packet header with a flow identifier associated with the flow, such that when the router receives the packet returned from the BITW firewall, the router is able to recover the original flow, which may otherwise be lost when the BITW firewall returns the packet to the router, thereby allowing the router to continue statefully processing the packet (e.g., applying security or other network services) according to the particular packet flow from which the packet was redirected to the BITW firewall.

In one example implementation in which traffic is sent from device hosting an application to the IP fabric in a data center (or from a customer edge (CE) router to the backbone), the router may replace a source MAC address of a MAC header of the packet with a flow identifier prior to redirecting the packet to an interface (e.g., left interface) of the BITW firewall. As described herein, the BITW firewall can be configured to return the packet to the router after applying security services. Moreover, because the BITW firewall does not modify the layer 2 headers of packets, the packet returned by the BITW firewall will include the flow identifier originally embedded by the router. As such, the router can be configured to receive the packet and use the flow identifier to recover the original packet flow for the packet and to continue processing the packet from before the packet was redirected to the BITW firewall.

In another example implementation in which traffic is sent from the IP fabric to the device hosting the application (or from the backbone to the customer edge (CE) router), the router may replace a destination MAC address of a MAC header of the packet with a flow identifier prior to redirecting the packet to an interface (e.g., right interface) of the BITW firewall. Because a BITW firewall does not modify the layer 2 headers of packets, the packet returned by the BITW firewall includes the flow identifier embedded by the router.

The router receives the packet and uses the flow identifier to recover the original flow of the packet and to continue processing the packet from before the packet was redirected to the BITW firewall.

The techniques described in this disclosure may provide one or more technical advantages that realizes at least one practical application. For example, by embedding a flow identifier in the packet, the router may receive the flow identifier that was originally embedded by the router and use the flow identifier to recover the original flow even if the 5-tuple of the packet is changed or lost. Moreover, by implementing the techniques described in this disclosure, BITW firewalls are not configured to restrict the modification of IP addresses and/or ports, which limits the overall utility of the BITW firewall. Additionally, by implementing the techniques of this disclosure, the flow information is not embedded in a proprietary header of a packet, which restricts the network to the use a specific BITW firewall and limits the ability to integrate with third party BITW firewalls.

In one example, this disclosure describes a method comprising receiving, by a network device, a packet. The method also comprises determining, by the network device, that the packet matches a packet flow that is associated with an action to redirect the packet to a firewall configured as a bump-in-the-wire. The method further comprises, in response to the determination: modifying, by the network device, a Media Access Control (MAC) address field of a layer 2 (L2) packet header with a flow identifier of the packet flow; sending, by the network device, the packet to the firewall; receiving, by the network device, the packet from the firewall; and recovering, by the network device, the packet flow by modifying the packet according to the flow identifier in the packet to restore the L2 packet header of the packet.

In another example, this disclosure describes a network device comprising a virtual machine interface to communicate packet flows with a host device; an Internet Protocol (IP) interface to communicate the packet flows with an IP fabric; and one or more processors coupled to a memory device, wherein the one or more processors are configured to: receive a packet; determine that the packet matches a first one of the packet flows that is associated with an action to redirect the packet to a firewall configured as a bump-in-the-wire; and in response to the determination: modify a Media Access Control (MAC) address field of a layer 2 (L2) packet header with a flow identifier of the first one of the packet flows; send the packet to the firewall; receive the packet from the firewall; and recover the first one of the packet flows by modifying the packet according to the flow identifier in the packet to restore the L2 packet header of the packet.

In yet another example, this disclosure describes a computing device comprising: a memory; and one or more processors coupled to the memory, wherein the one or more processors are configured to: instantiate a plurality of virtual execution elements, wherein a first virtual execution element is configured to provide an execution environment for one or more application workloads, and wherein a second virtual execution element is configured as a firewall configured as a bump-in-the-wire; attach a virtual network interface to the plurality of virtual execution elements to enable packetized communications by the plurality of virtual execution elements on a virtual network; and instantiate a virtual router configured to: receive a packet; determine that the packet matches a first one of the packet flows that is associated with an action to redirect the packet to a firewall configured as a bump-in-the-wire; and in response to the determination: modify a Media Access Control (MAC) address field of a layer 2 (L2) packet header with a flow identifier of the first one of the packet flows; send the packet to the firewall; receive the packet from the firewall; and recover the first one of the packet flows by modifying the packet according to the flow identifier in the packet to restore the L2 packet header of the packet.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
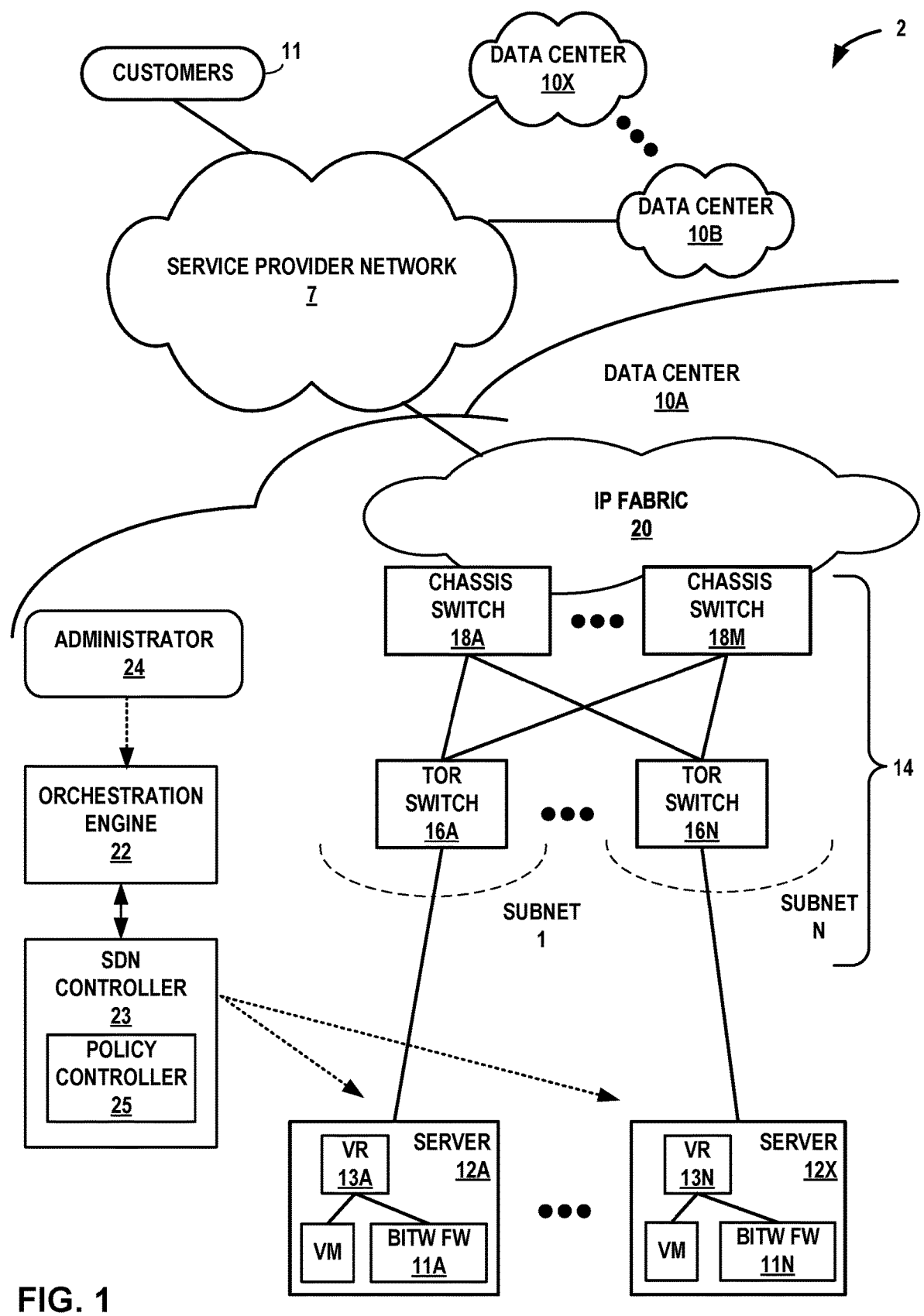
FIG. 1 is a block diagram illustrating an example network system in which packet flow information is preserved across host-based firewalls implemented as bump-in-the-wire firewalls, in accordance with the techniques described in this disclosure.

FIG. 1 is a block diagram illustrating another example network system in which packet flow information is preserved across host-based firewalls implemented as bump-in-the-wire (BITW) firewalls, in accordance with the techniques described in this disclosure.

Network system 2 in the example of FIG. 1 includes data centers 10A-10X (collectively, "data centers 10") interconnected with one another and with customer networks associated with customers 11 via a service provider network 7. In general, each data center 10 provides an operating environment for applications and services for customers 11 coupled to the data center by service provider network 7. Data centers 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, each data center 10 may represent one of many geographically distributed network data centers. As illustrated in the example of FIG. 1, each of data centers 10 may be a facility that provides network services for customers 11. Customers 11 may be collective categories such as enterprises and governments or individuals. For example, a network data center may host web services for several enterprises and end users. Other exemplary services may include data storage, virtual private networks, traffic engineering, file service, data mining, scientific- or super-computing, and so on. In some examples, each of data centers 10 may be individual network servers, network peers, or otherwise.

In this example, each of data centers 10 includes a set of storage systems and application servers 12A-12X (herein, "servers 12") interconnected via high-speed switch fabric 14 provided by one or more tiers of physical network switches and routers. Servers 12 function as compute nodes of the data center. In some examples, the terms "compute nodes" and "servers" are used interchangeably herein to refer to servers 12. Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. The term "virtual execution element" encompasses virtual machines ("VMs"), containers, and other virtualized computing resources that provide an (at least partially) independent execution environment for applications. These virtual execution elements can be tenants running virtualized application workloads, and may be referred to herein as a virtualized application workload (or just application workload). Each of the virtual network endpoints may use one or more virtual network interfaces to perform packet I/O or otherwise process a packet.

Switch fabric 14 is provided by a set of interconnected top-of-rack (TOR) switches 16A-16BN (collectively, "TOR switches 16") coupled to a distribution layer of chassis switches 18A-18M (collectively, "chassis switches 18"). In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data centers 10 and customers 11 by service provider network 7. Although not shown, each of data centers 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

Network system 2 implements an automation platform for automating deployment, scaling, and operations of virtual execution elements across servers 12 to provide virtualized infrastructure for execution of application workloads and services. For example, data centers 10 may include a Software-Defined Network ("SDN") platform to control and manage network behavior. In some cases, an SDN platform includes a logically centralized, and in some cases, physically distributed SDN controller, e.g., SDN controller 23, and a distributed forwarding plane in the form of virtual routers, e.g., virtual routers 13A-13N (collectively, "VRs 13"), that extend the network from physical routers and switches in the data center switch fabric into a virtual overlay network hosted in virtualized servers. SDN controller 23 facilitates operation of one or more virtual networks within each of data centers 10, such as data center 10A, in accordance with one or more examples of this disclosure. Virtual networks are logical constructs implemented on top of the physical network of data center 10A. In some examples, virtual networks may be implemented as a virtual private network (VPN), virtual LAN (VLAN), or the like. In some examples, SDN controller 23 may operate in response to configuration input received from orchestration engine 22, which in turn operates in response to configuration input received from network administrator 24. Additional information regarding SDN controller 23 operating in conjunction with other devices of data center 10A or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In some examples, orchestration engine 22 manages application-layer functions of data center 10 such as managing compute, storage, networking, and application resources executing on servers 12. "Orchestration," in the context of a virtualized computing infrastructure, generally refers to provisioning, scheduling, and managing virtual execution elements and/or applications and application services executing on such virtual execution elements to the host servers available to the orchestration platform. For example, orchestration engine 22 may attach virtual machines (VMs) to a tenant's virtual network and generally manage the launching, migration and deconstruction of the VMs as needed. In other examples, container orchestration permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Orchestrator 22 and SDN controller 23 together implement a controller for the network system 2. Orchestrator 22 and SDN controller 23 may execute on separate computing devices or execute on the same computing device. Each of orchestrator 22 and SDN controller 23 may be a distributed application that executes on one or more computing devices.

In some examples, SDN controller 23 is a lower-level controller tasked with managing the network and networking services of data center 10A and, in particular, switch fabric 14 that provides connectivity between servers 12. SDN controller 23 utilizes a set of communication protocols to configure and control routing and switching elements of switch fabric 14 to create an overlay network, which generally refers to as a set of tunnels for transporting packets between servers. Accordingly, SDN controller 23 may be configured to configure a network (e.g., switch fabric 14, IP fabric 20, etc.) to form tunnels between servers 12 and TORs 16. Servers 12 and TORs 16 are examples of computing devices.

One such communication protocol to configure the network (e.g., switch fabric 14, IP fabric 20, etc.) may include a messaging protocol such as eXtensible Messaging and Presence Protocol (XMPP), for example. For example, SDN controller 23 implements high-level requests from orchestration engine 22 by configuring physical switches, e.g. TOR switches 16, chassis switches 18, and switch fabric 14; physical routers; physical service nodes such as firewalls and load balancers; and virtual services such as virtual firewalls in a VM. SDN controller 23 maintains routing, networking, and configuration information within a state database. SDN controller 23 communicates a suitable subset of the routing information and configuration information from the state database to virtual network (VN) agents on each of servers 12A-12N.

Typically, the traffic between any two network devices, such as between network devices (not shown) within switch fabric 14 or between server 12 and customers 11 or between servers 12, for example, can traverse the physical network using many different paths. For example, routers, e.g., virtual routers 13, may include data structures that abstracts out the various communication paths. These data structures may store, for example, interfaces, packet flows, routes, next hops, and other networking information to enable virtual routers 13 to push packets to their destinations.

Typically, when a router, e.g., virtual router 13A, receives a packet from a host or source virtual execution element (e.g., virtual machine or container) or from IP fabric 20, the virtual router processes the packets based on packet flows (otherwise referred to herein as "flow"). Virtual router 13A determines whether a packet matches a particular packet flow, and if the packet matches a particular packet flow, virtual router 13A applies an action associated with the packet flow. If the packet does not match a particular packet flow, a packet flow is created.

A set of one or more protocol data units (PDUs) that match a particular flow entry represent a flow. Flows may be broadly classified using any parameter of a PDU, such as such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

In this example, a router determines the packet flow using a flow key. The flow key is based on five values, or "five-tuple," i.e., the source address, destination address, source port, destination port, and Virtual Routing and Forwarding (VRF). The flow key may also include a next hop identifier for the flow.

Virtual router 13A may include a flow table for different functionalities. For example, virtual router 13A includes a flow table for firewall policies, load balancing, statistics, etc. When virtual router 13A receives an incoming packet, virtual router 13A uses the flow key to hash into its flow table. If the incoming packet matches a flow entry in the flow table, an action associated with the flow is applied to the packet. Actions may include dropping the packet, allowing the packet, redirecting it to another routing instance, and other actions. As one example, a flow entry may cause the virtual router to redirect packets to a firewall if the packets match a particular flow (e.g., matches a specific source IP address).

In some instances, the firewall of a router may support firewall policies only up to layer 4. To provide firewall protection up to the application layer (e.g., layer 7), the router may redirect packets to a firewall that supports up to L7 firewall policies, referred to herein as Next Generation Firewalls (NGFWs). In some instances, NGFWs are configured as a bump-in-the-wire (BITW), e.g., BITW firewalls 11A-11N (collectively, "BITW firewalls 11"). In this example, BITW firewalls 11 are host-based firewalls (HBFs) implemented in a virtual execution element (e.g., virtual machine or container). Although the techniques described in this disclosure are described with respect to a BITW firewall implemented as a HBF, the techniques may also apply to a BITW firewall implemented as a non-HBF, such as a physical firewall. A BITW firewall is configured with an input interface to receive packets and an output interface to output packets after applying one or more security policies. The interfaces of the BITW firewall do not have any packet configurations. That is, as packets go through a BITW firewall, the firewall does not modify layer 2 headers of the packets. An advantage of using BITW firewalls is that these firewalls are integrated into a network without needing any configuration changes to existing devices to connect to the firewall.

In some examples, a router may redirect a packet to a BITW firewall mid-processing. That is, the router may redirect the packet to the BITW firewall, and continue processing after receiving the packet returned from the BITW firewall. BITW firewalls may in some instances modify the IP addresses and/or ports before returning the packet to the router. Moreover, the information about the VRF to which the packet belonged may also be lost. For example, the VRF is typically determined from the interface from which the virtual router receives the packet (e.g., virtual machine interface) or from a next hop pointed to by an MPLS label (or VNID in the case of VXLAN). By receiving a returned packet from the BITW firewall, the virtual router receives the packet on a different interface than the interface that originally received the packet from the source. This causes the router to lose the flow information needed to continue processing the packet from before the packet is redirected to the BITW firewall.

Without the techniques described in this disclosure, BITW firewalls are configured to restrict the modification of IP addresses and/or ports. These restrictions limit the overall utility of the BITW firewall. In another example, packets are embedded with flow information in packets with a proprietary header. Using a proprietary header restricts the use of specific BITW firewall and would limit the ability to integrate with third party BITW firewalls.

In accordance with the techniques described in this disclosure, a router may embed a flow identifier of a packet flow in a layer 2 header to preserve packet flow information across a BITW firewall such that the router may use the flow identifier to recover the original packet flow and to continue processing the packet from before the packet was redirected to the BITW firewall.

For example, a router, e.g., virtual router 13A, may receive a packet. Virtual router 13A may determine whether the packet matches a particular packet flow. In this example, virtual router 13A may determine that the packet matches a flow entry with an associated action to redirect the packet to BITW firewall 11A.

Prior to sending the packet to BITW firewall 11A, virtual router 13A may embed an identifier of the flow (referred to herein as "flow identifier") in a MAC address field of the layer 2 packet header. As further described in the example of FIG. 3, virtual router 13A may redirect the packet to a specific interface of BITW firewall 11A. Depending on the interface of BITW firewall 11A that virtual router 13A is to send the packet, virtual router 13A may embed the flow identifier in a source MAC address field or a destination MAC address field of the layer 2 packet header. In some examples, virtual router 13A may also embed a flow revision to the layer 2 packet header. The flow revision may be used to avoid race conditions. For example, if a last packet of a current flow is in flight at the BITW firewall 11A, but the flow becomes disconnected from virtual router 13A and another flow is established, the packet that is inflight from the previous flow would be sent to the new flow. This can be avoided by embedding the flow revision to the layer 2 packet header.

In this example, BITW firewall 11A receives the packet via a first interface, processes the packet with one or more policies, and returns the packet to virtual router 13A via a second interface. BITW firewall 11A returns the packet to virtual router 13A without changing the layer 2 packet header. In response to receiving the returned packet, virtual router 13A uses the flow identifier in the MAC address field of the layer 2 packet header to recover the original flow of the packet. In this way, virtual router 13A may continue statefully processing the packet (e.g., applying security or other network services) according to the original flow from before the packet was redirected to BITW firewall 11A. Additional examples of the operation to preserve packet flow information across a BITW firewall is further described below with respect to the examples of FIGS. 2 and 3.

Figure 2:
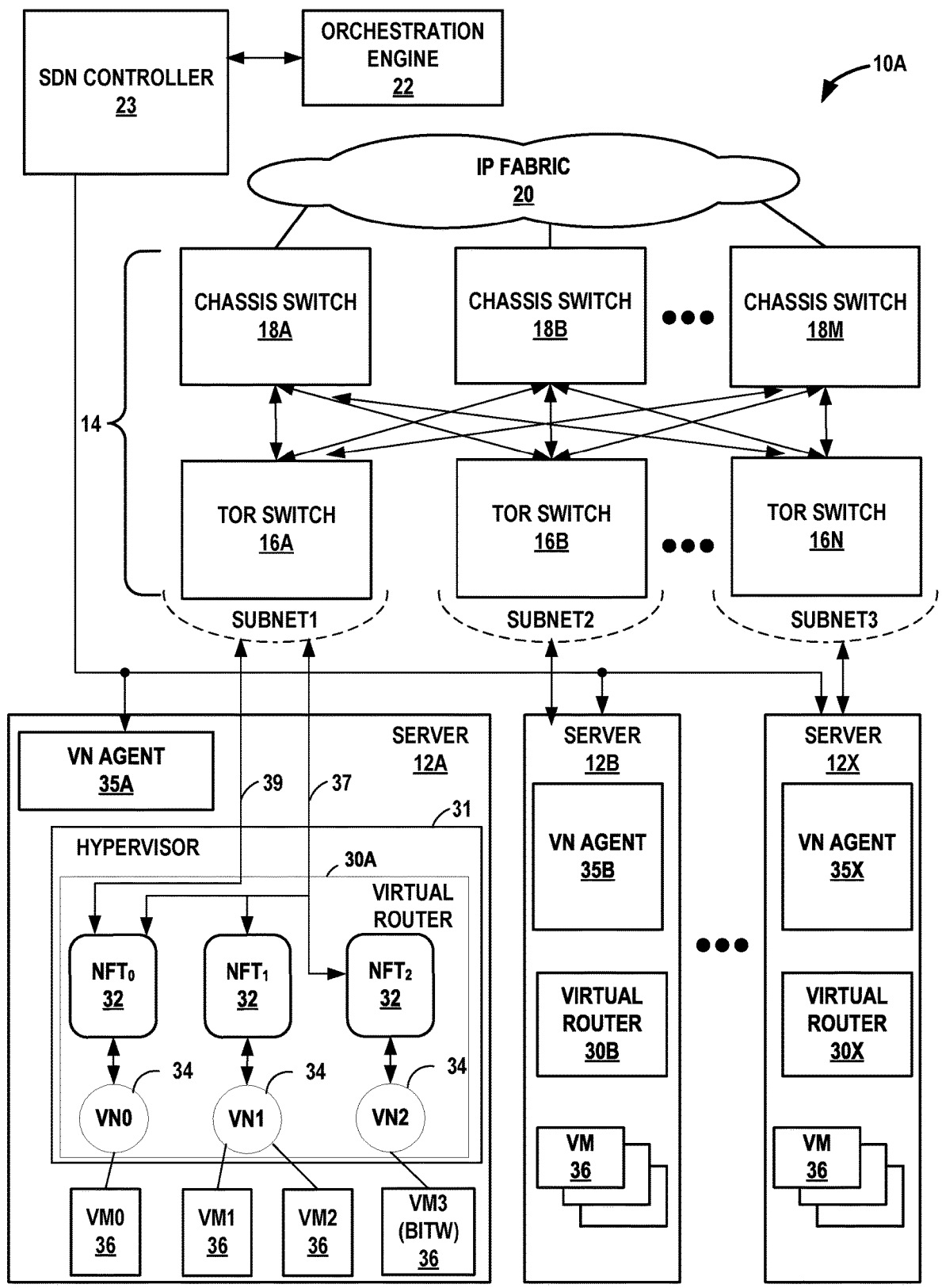
FIG. 2 is a block diagram illustrating an example implementation of the data center of FIG. 1 in further detail.

FIG. 2 is a block diagram illustrating an example implementation of data center 10A of FIG. 1 in further detail. In the example of FIG. 2, virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various techniques may be used to transport packets within and across virtual networks 34 over the physical network.

Each virtual router 30 may execute within a hypervisor, a host operating system or other component of each of servers 12. Each of servers 12 may represent an x86 or other general-purpose or special-purpose server capable of executing virtual machines 36. In the example of FIG. 2, virtual router 30A executes within hypervisor 31, also often referred to as a virtual machine manager (VMM), which provides a virtualization platform that allows multiple operating systems to concurrently run on one of servers 12. In the example of FIG. 2, virtual router 30A manages virtual networks 34 (e.g., VN0-VN2), each of which provides a network environment for execution of one or more virtual machines (VMs) 36 on top of the virtualization platform provided by hypervisor 31. Each VM 36 is associated with one of the virtual networks VN0-VN2 and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. In some cases, some of VMs 36 may represent containers, another form of virtualized execution environment. That is, both virtual machines and container are examples of virtualized execution environments for executing application workloads.

In general, each VM 36 may be any type of software application and may be assigned a virtual address for use within a corresponding virtual network 34, where each of the virtual networks may be a different virtual subnet provided by virtual router 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 1 or 2.

In one implementation, each of servers 12 includes a corresponding one of virtual network (VN) agents 35A-35X (collectively, "VN agents 35") that controls virtual networks 34 and that coordinates the routing of data packets within server 12. In general, each VN agent 35 communicates with virtual SDN controller 23, which generates commands to control routing of packets through data center 10A. VN agents 35 may operate as a proxy for control plane messages between virtual machines 36 and SDN controller 23. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10A to create one or more tunnels for interconnecting servers 12. Besides IPinIP, other example tunneling protocols that may be used include IP over GRE, VxLAN, MPLS over GRE, MPLS over UDP, etc.

As noted above, SDN controller 23 provides a logically centralized controller for facilitating operation of one or more virtual networks within data center 10A. SDN controller 23 may, for example, maintain a routing information base, e.g., one or more routing tables that store routing information for the physical network as well as one or more networks of data center 10A. Similarly, switches 16, 18 and virtual routers 30 maintain routing information, such as one or more routing and/or forwarding tables. In one example implementation, virtual router 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

In the example of FIG. 2, server 12A includes a virtual machine, e.g., VM3 36, that implements a BITW firewall (e.g., BITW firewall 11A of FIG. 1). The BITW firewall implemented on VM3 36 supports up to L7 firewall policies. In this example, virtual router 30A may redirect a packet to the BITW firewall implemented on VM3 36. To redirect packets to the BITW firewall, VN agent 35A may configure virtual router 30A to redirect traffic to the VM3 36 that implements the BITW firewall. As one example, VN agent 35A may implement tag-based firewall policies that mark the BITW firewall. Packets matching the tag-based firewall policies are redirected to the BITW firewall. In other examples, VN agent 35A may configure a service chain to redirect traffic to the BITW firewall. In these examples, VN agent 35A may configure the BITW firewall to include a first interface to receive incoming packets and a second interface to output the packet after applying one or more security policies. VN agent 35A also configures a first virtual network for the first interface and a second virtual network for the second interface. To direct traffic to the BITW firewall, a service chain is configured between the first and second virtual networks, and through VM3 36 that implements the BITW firewall.

In one example, VM0 36 may provide an instance of an application. Packets for the application originate from VM0 36 and are sent to a destination network device, such as to another server (e.g., server 12B) or to a customer device external to data center 10A via IP fabric 20. In this example, virtual router 30A may receive a packet from the host device, VM0 36, via a virtual machine interface (VMI) and determines whether the packet matches a packet flow stored in a flow table (not shown in FIG. 2) of the forwarding table, e.g., NFT 32. For example, virtual router 30A may use a flow key (e.g., based on the five-tuple of the incoming packet) to hash into the flow table of the forwarding table to look for a match with any flow entries of the forwarding table. If virtual router 30A determines that there is no match, virtual router 30A may send the packet to VN agent 35A, which installs a flow in the flow table. The flow table may include interfaces (e.g., virtual machine interfaces, virtual router interfaces), next hops, IP-to-MAC pairs, and other information associated with the flow.

In this example, VN agent 35A installs a flow to redirect a packet that matches the flow to the BITW firewall implemented on VM3 36. For example, VN agent 35A configures a flag in a flow entry that indicates the flow is to redirect the packet to a BITW firewall. In some examples, VN agent 35A may configure virtual router 30A to redirect the packet to a particular interface of the BITW firewall. For example, VN agent 35A may mark flows for the BITW firewall with a flag that indicates whether the packets are to be sent to the first or second interface of the BITW firewall. More specifically, if virtual router 30A receives the packet on a source VMI to VM0 36 and the packet is destined for IP fabric 20, VN agent 35A may set a flag of a flow entry to the left interface of the BITW firewall such that virtual router 30A redirects the packet to the left interface of the BITW firewall. In some examples, if virtual router 30A receives the packet on a source VMI to VM0 36 and the source virtual router interface index is less than the destination virtual router interface index, VN agent 35A may set a flag of a flow entry to the left interface of the BITW firewall such that virtual router 30A redirects the packet to the left interface of the BITW firewall. As another example, if virtual router 30A receives the packet on a source VMI to VM0 36 and the source virtual router interface index is not less than the destination virtual router interface index, VN agent 35A may set the flag of a flow entry to the right interface of the BITW firewall such that virtual router 30A redirects the packet to the right interface of the BITW firewall. In yet another example, if virtual router 30A receives the packet on a fabric interface to IP fabric 20 and the packet is destined for a destination VMI (e.g., interface to VM1 36), VN agent 35A may set a flag of a flow entry to the right interface of the BITW firewall such that virtual router 30A redirects the packet to the right interface of the BITW firewall.

When adding the flow to virtual router 30A, VN agent 35A may also send the left interface and the right interface indices to virtual router 30A. In this way, virtual router 30A maintains a map of VRF to the left and right interfaces of the BITW firewall.

In the examples in which virtual router 30A receives a packet from a source VMI and is configured to send the packet to the left interface of the BITW firewall implemented on VM3 36 (e.g., flag of flow entry set to left interface), VN agent 35A configures virtual router 30A to embed an identifier of the flow (referred to herein as "flow identifier") in the source MAC address field of the L2 header of the packet. For example, virtual router 30A may replace an original source MAC address in the source MAC address field with the flow identifier.

In some examples, if an L3 VPN is implemented, VN agent 35A configures virtual router 30A to use the MAC address of the BITW firewall in the destination MAC address field of the L2 header. Alternatively, if an L2 VPN is implemented, VN agent 35A configures virtual router 30A to leave the destination MAC address field of the L2 header unchanged. In some examples, in addition to encoding the flow identifier as the source MAC address of the L2 header, VN agent 35A configures virtual router 13A to encode a direction bit in the source MAC address field to indicate the packet source is from a virtual machine interface, e.g., "FROM_VMI" bit.

In these examples, the BITW firewall implemented on VM3 36 receives the packet via its left interface, processes the packet with one or more policies, and returns the packet to virtual router 30A via its right interface. In response to receiving the returned packet from the right interface of the BITW firewall, virtual router 30A is configured to use the flow identifier to recover the original flow of the packet. For example, VN agent 35A configures virtual router 30A to use the flow identifier in the source MAC address field of the L2 header as a flow index to recover the original flow.

Because the source MAC address field was replaced when redirecting the packet to the BITW firewall, VN agent 35A configures virtual router 30A to restore the original source MAC address of the packet using the original flow. For example, the flow (that was generated for the packet when the packet was originally received by the virtual router) includes interfaces (e.g., virtual router interface (vif), virtual machine interface (VMI), next-hops, IP-to-MAC pairs, and other information. VN agent 35A configures virtual router 30A to use the flow information (e.g., interfaces, next-hops, IP-to-MAC pairs) to determine the source VMI from which the virtual router 30A originally received the packet. Using the source VMI, virtual router 30A may determine the original source MAC address of the packet. If an L2 VPN is implemented, VN agent 35A configures virtual router 30A to restore the original source MAC address from a flow key next hop to the virtual router 30A interface (e.g., vif) using the source IP address of the flow. In this way, virtual router 30A restores the packet header with the original source MAC address and may continue processing the packet from before the packet was redirected to the BITW firewall implemented on VM3 36. Virtual router 30A is also configured to skip the BITW firewall processing to avoid looping the packet back to the BITW firewall and continues with other actions associated with the flow (e.g., NAT, mirroring, service chaining, etc.).

In the examples in which virtual router 30A receives a packet from a fabric interface to IP fabric 20 and is configured to send the packet to the right interface of the BITW firewall implemented on VM3 36 (e.g., flag of flow entry set to right interface), VN agent 35A configures virtual router 30A to embed a flow identifier in the destination MAC address field of the L2 header of the packet. For example, virtual router 30A may replace an original destination MAC address in the destination MAC address field with the flow identifier.

In some examples, VN agent 35A configures virtual router 30A to use a Virtual Router Redundancy Protocol (VRRP) MAC address in the source MAC address field of the L2 header if the incoming packet matches an IP address family next hop. Additionally, VN agent 35A configures virtual router 30A to leave the source MAC address field of the L2 header unchanged if the incoming packet matches a bridge address family next hop. In some examples, in addition to encoding the flow identifier in the destination MAC address filed of the L2 header, virtual router 13A encodes a bit in the destination MAC address field to indicate the packet source is from the IP fabric, e.g., "FROM_FABRIC" bit.

In these examples, the BITW firewall implemented on VM3 36 receives the packet via its right interface, processes the packet with one or more policies, and returns the packet to virtual router 30A via its left interface. In response to receiving the returned packet from the left interface of the BITW firewall, virtual router 30A is configured to use the flow identifier to recover the original flow of the packet. For example, VN agent 35A configures virtual router 30A to use the flow identifier in the destination MAC address field of the L2 header as a flow index to recover the original flow.

Because the destination MAC address was replaced when redirecting the packet to BITW firewall 11A, VN agent 35A configures virtual router 13A to restore the original destination MAC address using the original flow. As described above, the flow (that was generated for the packet when the packet was originally received by the virtual router) includes interfaces (e.g., vif, VMI), next-hops, IP-to-MAC pairs, and other information. VN agent 35A configures virtual router 30A to use the flow information (e.g., interfaces, next-hops, IP-to-MAC pairs) to determine the destination VMI of virtual router 30A that is used to send the packet to the eventual destination (e.g., VM1 36). Using the destination VMI, virtual router 30A may determine the original destination MAC address of the packet. For example, if a FROM_FABRIC bit is set, in the case L2 VPNs, VN agent 35A configures virtual router 30A to restore the original destination MAC address from the flow key next hop to an interface of virtual router 30A (e.g., vif) using the destination IP address of the flow. If the FROM_VMI bit is set and the interface flag is set to the right interface, R, of the BITW firewall, VN agent 35A configures virtual router 30A to restore the destination MAC address from a reverse flow key next hop to an interface of virtual router 13A (e.g., vif) using the destination IP address of the flow. In this way, virtual router 13A restores the packet header with the original destination MAC address and may continue processing the packet from before the packet was redirected to the BITW firewall implemented on VM3 36. Virtual router 30A is also configured to skip the BITW firewall processing to avoid looping the packet back to the BITW firewall and continues with other actions associated with the flow (e.g., NAT, mirroring, service chaining, etc.).

Figure 3:
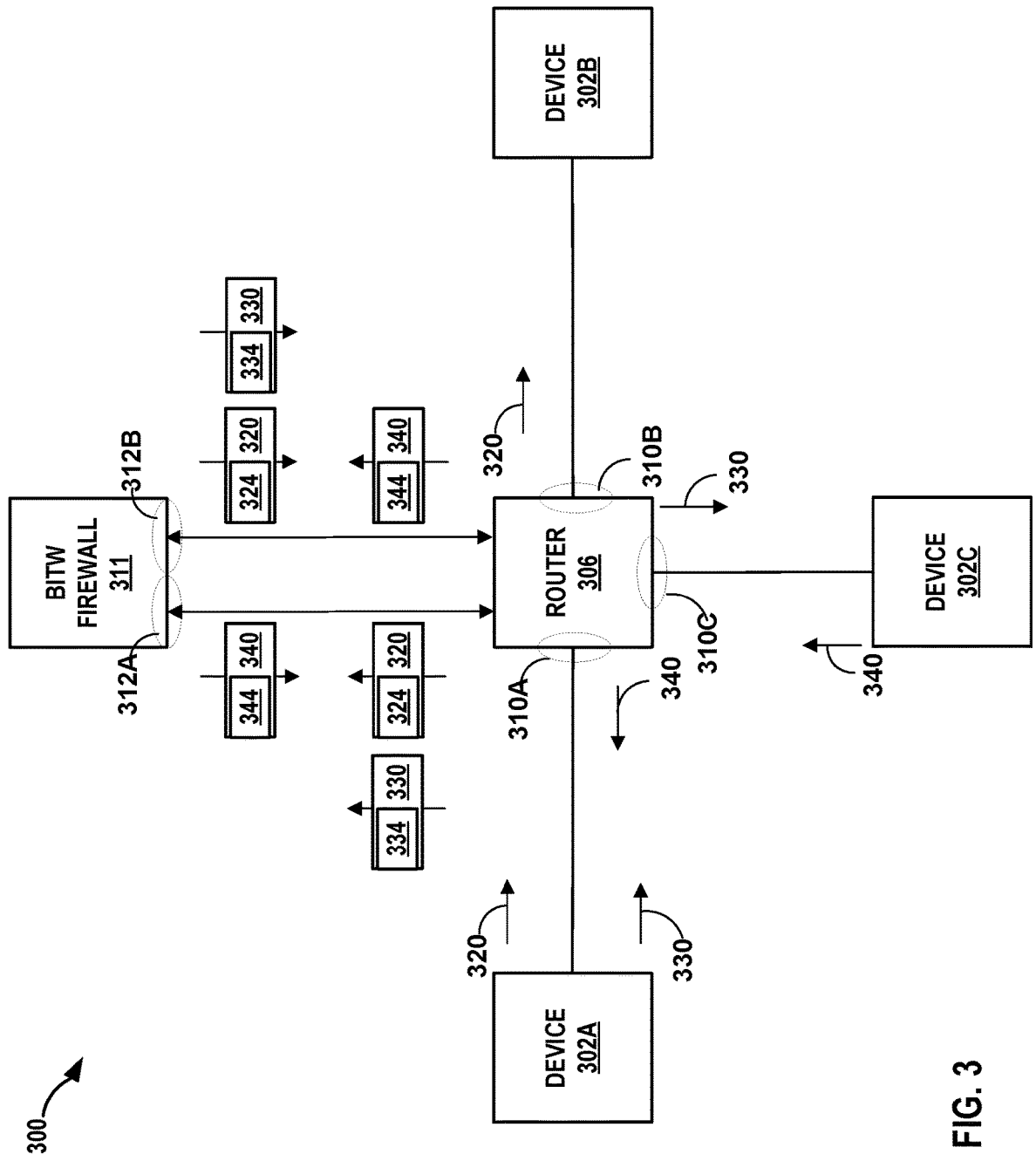
FIG. 3 is a block diagram illustrating an example operation of a router embedding flow information in greater detail, in accordance with the techniques described in this disclosure.

FIG. 3 is a block diagram illustrating an example operation of a router embedding flow information in greater detail, in accordance with the techniques described in this disclosure. BITW firewall 311 in the example of FIG. 3 is an example implementation of any of BITW firewalls 11 of FIG. 1.

In the example of FIG. 3, devices 302A-302C (collectively, "devices 302") may send traffic via router 306. Devices 302 may represent virtual devices (e.g., virtual machines or containers) or physical devices. Router 306 may send packets to and receive packets from devices 302 via interfaces 310A-310C (collectively, "interfaces 310"). In the example of FIG. 3, interface 310A may represent a virtual machine interface that interfaces with device 302A implemented as a virtual machine (referred to herein as "VMI 310A"), interface 310B may represent a virtual machine interface that interfaces with device 302B implemented as a virtual machine (referred to herein as "VMI 310B"), and interface 310C may represent a fabric interface that interfaces with an IP fabric (referred to herein as "fabric interface 310C)).

In one example, router 306 may receive packet 320 via virtual machine interface 310A. In response to receiving packet 320 from device 302A via VMI 310A, router 306 processes packet 320 based on a packet flow. For example, router 306 uses the five-tuple of packet 320 as a flow key to hash into a flow table. If router 306 determines that packet 320 matches a particular packet flow, router 306 applies an action associated with the packet flow, such as to redirect packet 320 to BITW firewall 311. If packet 320 does not match a particular packet flow, a packet flow is created to redirect packet 320 (and subsequent packets that match the flow) to BITW firewall 311.

In this example, router 306 may determine packet 320 matches a flow entry marked with a flag to redirect the packet to BITW firewall 311. The flow entry may include a flag set to a particular interface of BITW firewall 311. As described above, BITW firewall 311 is configured to include a first interface to receive packets and a second interface to output packets. Router 306 may include a flow entry including a flag set to the first interface, e.g., left interface 312A, of BITW firewall 311 if router 306 receives packet 320 via VMI 310A and the destination of packet 320 is a destination VMI, e.g., destination VMI 310B, and if the source virtual router interface (vif) index is less than the destination vif index. If the source vif index is not less than the destination vif index, router 306 sets the flag to the second interface, e.g., right interface 312B, of BITW firewall 311.

Responsive to determining that router 306 is to send packet 320 to the left interface 312A of BITW firewall 311, router 306 replaces a source MAC address field of an L2 header of packet 320 with flow identifier 324. In some examples, if an L3 VPN is implemented, router 306 uses the MAC address of BITW firewall 311 as the destination MAC address of the L2 header. Alternatively, if an L2 VPN is implemented, router 306 leaves the destination MAC address of the L2 header unchanged. In some examples, in addition to encoding the flow identifier as the source MAC address of the L2 header, router 306 encodes a direction bit in the source MAC address field to indicate the packet source is from a virtual machine interface, e.g., "FROM_VMI" bit.

BITW firewall 311 receives packet 320 via left interface 312A, processes the packet with one or more policies, and returns packet 320 to router 306 via right interface 312B. BITW firewall 311 returns packet 320 without changing the layer 2 header of packet 320. In response to receiving the returned packet from right interface 312B of BITW firewall 311, router 306 uses flow identifier 324 to recover the original flow of packet 320. For example, router 306 uses flow identifier 324 as a flow index to recover the original flow.

Router 306 may restore the original source MAC address of packet 320 using the original flow. For example, router 306 uses the original flow that was recovered from flow identifier 324 to determine the source VMI (e.g., VMI 310A) from which router 306 originally received packet 320. Using the source VMI 310A, router 306 may determine the original source MAC address of packet 320. For example, router 306 restores the original source MAC address from a flow key next hop to an interface of router 306 (e.g., VMI 310A) using the source IP address of the flow. Router 306 restores the L2 packet header of packet 320 with the original source MAC address and may continue statefully processing packet 320 from before the packet was redirected to BITW firewall 311. Router 306 skips the BITW firewall processing to avoid looping the packet back to BITW firewall 311 and continues with other actions associated with the flow (e.g., NAT, mirroring, service chaining, etc.), and forwards to device 302B via destination VMI 310B.

As another example, router 306 may receive packet 330 from device 302A that is destined for device 302C. In this example, router 306 may determine packet 330 matches a flow entry marked with a flag to redirect the packet to BITW firewall 311. The flow entry may include a flag set to a particular interface of BITW firewall 311. In this example, the flag of a flow entry is set to left interface 312A if packet 330 enters router 306 via source VMI 310A and the destination of packet 330 is an IP fabric. Similar to packet 320, router 306 replaces a source MAC address field of an L2 header of packet 330 with flow identifier 334, and sends packet 330 to the left interface 312A of BITW firewall 311. BITW firewall 311 receives packet 330 via left interface 312A, processes the packet with one or more policies, and returns packet 330 to router 306 via right interface 312B. BITW firewall 311 returns packet 330 without changing the layer 2 header of packet 330. In response to receiving the returned packet from right interface 312B of BITW firewall 311, router 306 uses flow identifier 334 to recover the original flow of packet 330. Router 306 restores the L2 packet header of packet 330 with the original source MAC address and may continue statefully processing packet 330 from before the packet was redirected to BITW firewall 311.

In another example, router 306 may receive packet 340 via its fabric interface, e.g., fabric interface 310C and destined for device 302A. In this example, router 306 may determine packet 340 matches a flow entry marked with a flag to redirect the packet to BITW firewall 311. The flow entry may include a flag set to the second interface, e.g., right interface 312B, of BITW firewall 311.

Responsive to determining that router 306 is to send packet 340 to the right interface 312B of BITW firewall 311, router 306 replaces a destination MAC address field of an L2 header of packet 340 with flow identifier 344. If packet 340 matches an IP address family next hop, router 306 uses a Virtual Router Redundancy Protocol (VRRP) MAC address in the source MAC address field of the L2 header. If packet 340 matches a bridge address family next hop, router 306 leaves the source MAC address field of the L2 header unchanged. In some examples, in addition to encoding the flow identifier in the destination MAC address filed of the L2 header, router 306 encodes a direction bit in the destination MAC address field to indicate the packet source is from the IP fabric, e.g., "FROM_FABRIC" bit.

BITW firewall 311 receives packet 340 via right interface 312B, processes the packet with one or more policies, and returns packet 340 via left interface 312A. BITW firewall 311 returns packet 340 without changing the layer 2 header of packet 340. In response to receiving the returned packet from left interface 312A of BITW firewall 311, router 306 uses flow identifier 344 to recover the original flow of the packet. For example, router 306 uses flow identifier 344 in the destination MAC field as a flow index to recover the original flow.

Router 306 may restore the original destination MAC address using the original flow. For example, router 306 may use the original flow that was recovered from flow identifier 344 to determine the destination VMI that router 306 is to use to send the packet onward toward the destination of the packet, e.g., device 302A. Using the destination VMI, e.g., VMI 310A, router 306 may determine the original destination MAC address of packet 340. If a FROM_FABRIC bit is set, in the case L2 VPNs, router 306 restores the original destination MAC address from a flow key next hop to an interface of router 306 using the destination IP address of the flow. If the FROM_VMI bit is set and the interface flag of a flow entry is set to the right interface, R, of BITW firewall 311, the destination MAC address is restored from an IP-to-MAC map of a reverse flow key next hop to an interface of router 306 using the destination IP address of the flow. Router 306 restores the packet header of packet 340 with the original destination MAC address and may continue statefully processing packet 340 from before the packet was redirected to BITW firewall 311. Router 306 skips the BITW firewall processing to avoid looping the packet back to BITW firewall 311 and continues with other actions associated with the flow (e.g., NAT, mirroring, service chaining, etc.), and forwards to device 302A via destination VMI 310A.

In some examples, a flow identifier embedded in the packet may be allocated to a new flow. In these examples, when virtual router 13A receives a packet returned from BITW firewall 11A, the flow identifier included in the packet does not point to the flow the packet had originally matched with when the packet was redirected to BITW firewall 11A. To avoid this mismatch, virtual router 13A embeds a second identifier, e.g., gen-id, in the source/destination MAC address field along with the flow identifier. In this way, when virtual router 13A receives the packet returned from BITW firewall 11A, virtual router 13A may compare the gen-id included with the flow identifier with the gen-id of the flow stored in virtual router 13A. If the identifiers do not match, virtual router 13A discards the packet.

In further examples, BITW firewall 311 may drop the packet that it receives, generate a new packet and return the new packet to the source of the original packet. As one example, BITW firewall may block a Transmission Control Protocol (TCP) connection by dropping a synchronize (SYN) packet, generates a reset (RST) packet, and sends the RST packet to the source originating the SYN packet.

When redirecting the packet to BITW firewall, router 306 encodes a bit indicating the source of the packet in addition to the flow identifier (and in some instances, the gen-id). For example, if router 306 originally receives a packet from a source VMI, router 306 encodes a bit indicating the source (e.g., "FROM_VMI" bit) in the source MAC field of a packet redirected to left interface 312A of BITW firewall 311.

In response to receiving the packet via left interface 312A of BITW firewall 311, BITW firewall 311 uses the source IP/MAC address from the dropped packet (e.g., SYN packet) as the destination IP/MAC address in the generated packet and sends the packet via the interface that dropped the packet, e.g., the left interface.

In response to receiving the packet from the left interface 312A of BITW firewall 311, router 306 may process the packet as if the packet is coming from the destination of the dropped packet. Router 306 may process the packet using the reverse flow of the flow that had redirected the packet to BITW firewall 311. For example, in response to receiving the packet (including the FROM_VMI bit and a flag set to left interface 312A of BITW firewall 311) via the left interface 312A of BITW firewall 311, router 306 determines that the packet is a packet generated by BITW firewall 311 and uses the reverse flow.

Alternatively, if router 306 originally receives a packet from the IP fabric (e.g., network 306C), router 306 encodes a bit indicating the source (e.g., "FROM_FABRIC" bit) in the destination MAC field of a packet redirected to the right interface 312B of BITW firewall 311.

In response to receiving the packet via the right interface 312B of BITW firewall 311, BITW firewall 311 uses the destination IP/MAC address from the dropped packet as the source IP/MAC address in the generated packet and sends the packet via the interface that dropped the packet, e.g., the right interface 312B.

In response to receiving the packet via the right interface 312B of BITW firewall 311, router 306 may process the packet as if the packet is coming from the destination of the dropped packet. Router 306 may process the packet using the reverse flow of the flow that had redirected the packet to BITW firewall 311. For example, in response to receiving the packet (including the FROM_FABRIC bit and a flag set to the right interface 312B of BITW firewall 311) via the right interface 312B of BITW firewall 311, router 306 determines that the packet is a packet generated by BITW firewall 311 and uses the reverse flow.

In some examples, in response to BITW firewall 311 changing from an HBF to a non-HBF, router 306 re-programs flows for the HBF to flows for the non-HBF. Alternatively, in response to BITW firewall 311 changing from a non-HBF to an HBF, router 306 re-programs flows for the non-HBF to flows for the HBF.

In some examples, in response to BITW firewall 311 becoming disabled (from being enabled), the interfaces of BITW firewall 311 are withdrawn from router 306. Entries for the VRFs mapped to BITW firewall 311 are also removed. Router 306 drops packets matching flows for BITW firewall 311 because the destination of the packet does not match an entry to VRFs mapped to BITW firewall 311. Alternatively, in response to BITW firewall 311 becoming enabled (from being disabled), the interfaces of BITW firewall 311 are added to router 306. Entries for the VRFs mapping to BITW firewall 311 are added. In this way, router 306 may redirect packets matching an entry to VRFs mapped to BITW firewall 311.

Figure 4:
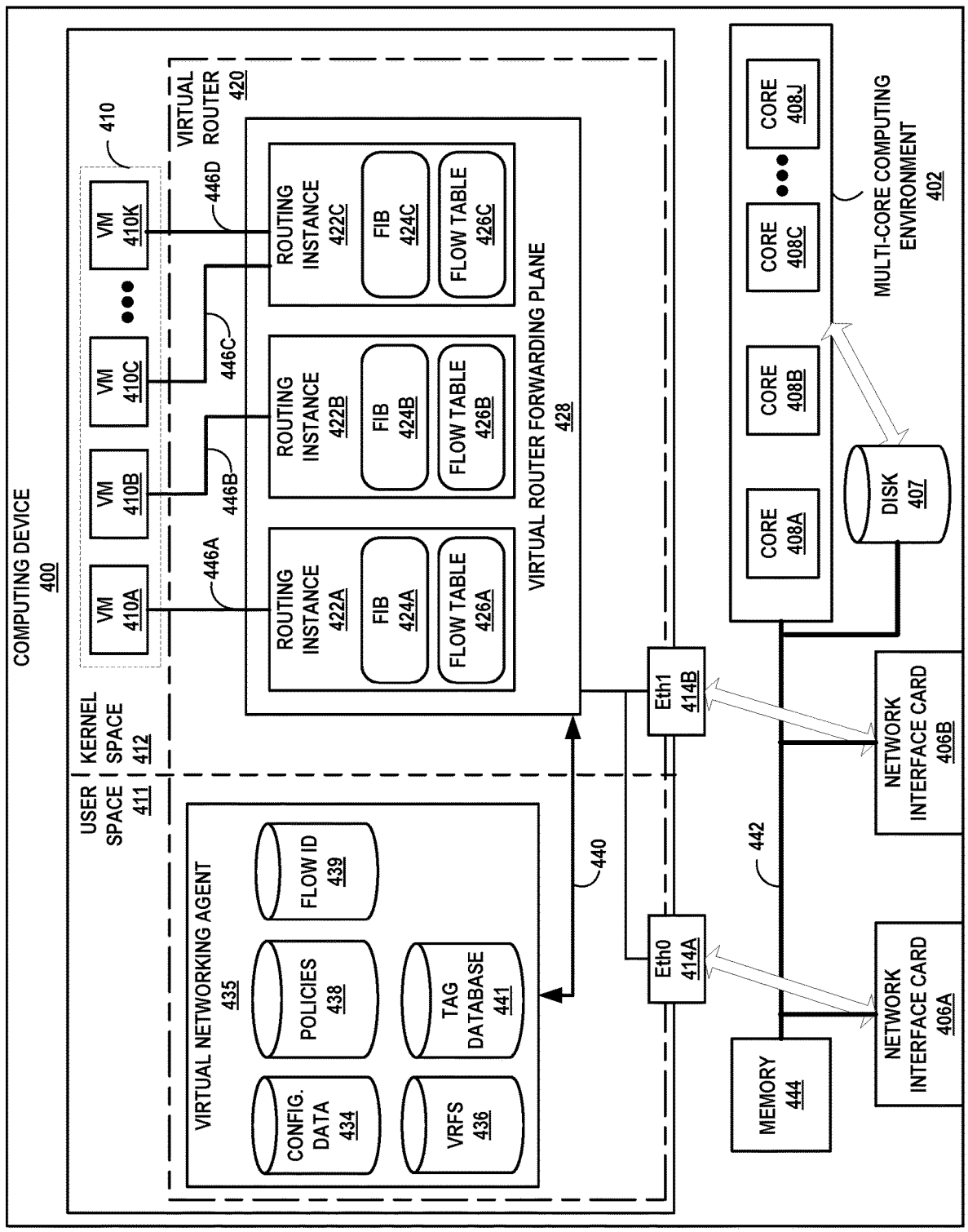
FIG. 4 is a block diagram illustrating an example computing device, in accordance with the techniques described in this disclosure.

FIG. 4 is a block diagram illustrating an example computing device, in accordance with the techniques described in this disclosure. Computing device 400 may represent an example instance of any of servers 12 of FIGS. 1-2.

Computing device 400 includes in this example a system bus 442 coupling hardware components of a computing device 400 hardware environment. System bus 442 couples memory 444, network interface cards (NICs) 406A-406B (collectively, "NICs 406"), storage disk 407, and multi-core computing environment 402 having a plurality of processing cores 408A-408J (collectively, "processing cores 408"). Network interface cards 406 include interfaces configured to exchange packets using links of an underlying physical network. Multi-core computing environment 402 may include any number of processors and any number of hardware cores. Each of processing cores 408 each includes an independent execution unit to perform instructions that conform to an instruction set architecture for the core. Processing cores 408 may each be implemented as separate integrated circuits (ICs) or may be combined within one or more multi-core processors (or "many-core" processors) that are each implemented using a single IC (i.e., a chip multiprocessor).

Disk 407 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 408.

Main memory 444 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 444 provides a physical address space composed of addressable memory locations.

Memory 444 may in some examples present a non-uniform memory access (NUMA) architecture to multi-core computing environment 402. That is, cores 408 may not have equal memory access time to the various storage media that constitute memory 444. Cores 408 may be configured in some instances to use the portions of memory 444 that offer the lowest memory latency for the cores to reduce overall memory latency.

In some instances, a physical address space for a computer-readable storage medium may be shared among one or more cores 408 (i.e., a shared memory). For example, cores 408A, 408B may be connected via a memory bus (not shown) to one or more DRAM packages, modules, and/or chips (also not shown) that present a physical address space accessible by cores 408A, 408B. While this physical address space may offer the lowest memory access time to cores 408A, 408B of any of portions of memory 444, at least some of the remaining portions of memory 444 may be directly accessible to cores 408A, 408B. One or more of cores 408 may also include an L1/L2/L3 cache or a combination thereof. The respective caches for cores 408 offer the lowest-latency memory access of any of storage media for the cores 508.

Memory 544, network interface cards (NICs) 406A-406B (collectively, "NICs 406"), storage disk 407, and multi-core computing environment 402 provide an operating environment for a software stack that executes a virtual router 420 and one or more virtual machines 410A-410K (collectively, "virtual machines 410"). Virtual router 420 may represent example instances of any of virtual routers 30 of FIG. 2. Virtual machines 410 may represent example instances of any of virtual machines 36 of FIG. 2. The computing device 400 partitions the virtual and/or physical address space provided by main memory 444 and in the case of virtual memory by disk 407 into user space 411, allocated for running user processes, and kernel space 412, which is protected and generally inaccessible by user processes. An operating system kernel (not shown in FIG. 4) may execute in kernel space and may include, for example, a Linux, Berkeley Software Distribution (BSD), another Unix-variant kernel, or a Windows server operating system kernel, available from Microsoft Corp. Computing device 400 may in some instances execute a hypervisor to manage virtual machines 410 (also not shown in FIG. 4). An example hypervisor 31 is illustrated in FIG. 2. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information such as FIBs 424 may execute the virtual router 420.

Eth0 414A and Eth1 414B represent devices according to a software device model and provide device driver software routines for handling packets for receipt/transmission by corresponding NICs 406. Packets received by NICs 406 from the underlying physical network fabric for the virtual networks may include an outer header to allow the physical network fabric to tunnel the payload or "inner packet" to a physical network address for one of NICs 406. The outer header may include not only the physical network address but also a virtual network identifier such as a VxLAN tag or Multiprotocol Label Switching (MPLS) label that identifies one of the virtual networks as well as the corresponding routing instance 422. An inner packet includes an inner header having a destination network address that conform to the virtual network addressing space for the virtual network identified by the virtual network identifier. For example, virtual router forwarding plane 428 may receive by Eth1 from NIC 406 a packet having an outer header than includes a VxLAN associated in virtual router forwarding plane 428 with routing instance 422A. The packet may have an inner header having a destination network address that is a destination address of VM 410A that taps, via tap interface 446A, into routing instance 422A.

Virtual router 420 in this example includes a kernel space 412 module: virtual router forwarding plane 428, as well as a user space 411 module: VN agent 435. Virtual router forwarding plane 428 executes the "forwarding plane" or packet forwarding functionality of the virtual router 420 and VN agent 435 executes the "control plane" functionality of the virtual router 420. VN agent 435 may represent an example instance of any of VN agents 35 of FIG. 2.

In this example, VN agent 435 may be a user space 411 process executed by computing device 400. VN agent 435 includes configuration data 434, virtual routing and forwarding instances configurations 436 ("VRFs 436"), and policy table 438 ("policies 438"). VN agent 435 exchanges control information with one or more SDN controllers (e.g., SDN controller 23 of FIGS. 1-2). Control information may include, virtual network routes, low-level configuration state such as routing instances and forwarding policy for installation to configuration data 434, VRFs 436, and policies 438. VN agent 435 may also report analytics state, install forwarding state to FIBs 424 of virtual router forwarding plane 428, discover VMs 410 and attributes thereof. As noted above, VN agent 435 further applies slow-path packet processing for the first (initial) packet of each new flow traversing virtual router forwarding plane 428 and installs corresponding flow entries to flow tables 426 for the new flows for fast path processing by virtual router forwarding plane 428 for subsequent packets of the flows.

Virtual router forwarding plane 428 includes multiple routing instances 422A-422C (collectively, "routing instances 422") for corresponding virtual networks. Each of routing instances 422 includes a corresponding one of forwarding information bases (FIBs) 424A-424C (collectively, "FIBs 424") and flow tables 426A-426C (collectively, "flow tables 426"). Although illustrated as separate data structures, flow tables 426 may in some instances be logical tables implemented as a single table or other associative data structure in which entries for respective flow tables 426 are identifiable by the virtual network identifier (e.g., a VRF identifier such as VxLAN tag or MPLS label)). FIBs 424 include lookup tables that map destination addresses to destination next hops. The destination addresses may include layer 3 network prefixes or layer 2 MAC addresses. Flow tables 426 enable application of forwarding policies to flows. Each of flow tables 426 includes flow table entries that each match one or more flows that may traverse virtual router forwarding plane 428 and include a forwarding policy for application to matching flows. For example, virtual router forwarding plane 428 attempts to match packets processed by routing instance 422A to one of the flow table entries of flow table 426A. If a matching flow table entry exists for a given packet, virtual router forwarding plane 428 applies the flow actions specified in a policy to the packet. This may be referred to as "fast-path" packet processing. If a matching flow table entry does not exist for the packet, the packet may represent an initial packet for a new packet flow and virtual router forwarding plane 428 may request VN agent 435 to install a flow table entry in the flow table for the new packet flow. This may be referred to as "slow-path" packet processing for initial packets of packet flows and is represented in FIG. 4 by slow path 440.

In some examples, flow tables 426 may include Allowed Address Pairs (AAPs) that specify IP-to-MAC pairs that are allowed to pass a port of computing device 400 regardless of the subnet associated with the network. In these examples, virtual router 420 may recover an original MAC address from the IP-to-MAC map of flow key next hop to an interface of virtual router 420. As one example, virtual machine interfaces of virtual router 420 are configured to have the same AAP IP and packets use the VMI MACs as a source MAC address, as shown below:

VMI1:<IP1, MAC1, AAP-IP, AAP-MAC1>
VMI2:<IP2, MAC2, AAP-IP, AAP-MAC2>
Packets use <AAP-IP, MAC 1> and <AAP-IP, MAC2>

In this example, flows from the VMI1 and VMI2 use the corresponding vif next hop as a flow key next hop. In this way, when a packet enters virtual router 420 from a right or left interface of the BITW firewall (implemented on one of VMs 410), virtual router 420 may use the flow identifier embedded in the MAC address field of the layer 2 packet header to recover the original MAC address from the IP-to-MAC map of the flow key next hop's vif.

As another example, virtual machine interfaces are configured to have the same AAP IP and packets use the corresponding AAP MACs as a source MAC address, as shown below:

VMI1:<IP1, MAC1, AAP-IP, AAP-MAC1>
VMI2:<IP2, MAC2, AAP-IP, AAP-MAC2>
Packets use <AAP-IP, AAP-MAC1> and <AAP-IP, AAP-MAC2>

In this example, flows from VMI1 and VMI2 use the corresponding vif next hop as a flow key next hop. In this way, when a packet enters virtual router 420 from a right or left interface of the BITW firewall, virtual router 420 may use the flow identifier embedded in the source/destination MAC address field of the layer 2 packet header to recover the original MAC address from IP-to-MAC map of flow key next hop's vif.

As another example, a single virtual machine interface is configured with AAP, as shown below:
  One VMI configured with AAP
  VMI:<IP, MAC, AAP-IP, AAP-MAC>
  Packets use <IP, MAC> and <AAP-IP, AAP-MAC>

In this example, two flows are created. Flows from the two IP addresses use the same vif next hop as flow key next hop. In this way, when a packet enters virtual router 420 from a right or left interface of the BITW firewall, virtual router 420 may use the flow identifier embedded in the source/destination MAC address field of the layer 2 packet header to recover the original flow. The IP-to-MAC map of flow key NH's vif of the original flow is then used recover the original source/destination MAC address.

As yet another example, a single virtual machine interface is configured with AAP, as shown below:
  One VMI configured with AAP
  VMI:<IP, MAC, AAP-IP, AAP-MAC>
  Packets use <IP, MAC> and <IP, AAP-MAC>

In this example, one flow is created with vif next hop as flow key next hop. The index of the MAC that triggered the creation of the flow is the MAC index in the flow. When a packet enters virtual router 420 from a right or left interface of the BITW firewall, virtual router 420 uses the flow identifier embedded in the source/destination MAC address field of the layer 2 packet header to recover the original flow.

As yet another example, a single virtual machine interface is configured with AAP, as shown below:
  One VMI configured with AAP
  VMI:<IP, MAC, AAP-IP, AAP-MAC>
  Packets use <IP, MAC> and >AAP -IP, MAC>

In this example, two flows are created. Flows from the two IP addresses use the same vif next hop as flow key next hop. When a packet enters virtual router 420 from a right or left interface of the BITW firewall, virtual router 420 uses the flow identifier embedded in the source/destination MAC address field of the layer 2 packet header to recover the original flow. Virtual router 420 then uses the IP-to-MAC map of flow key next hop's vif to recover the original source/destination MAC address.

Figure 5:
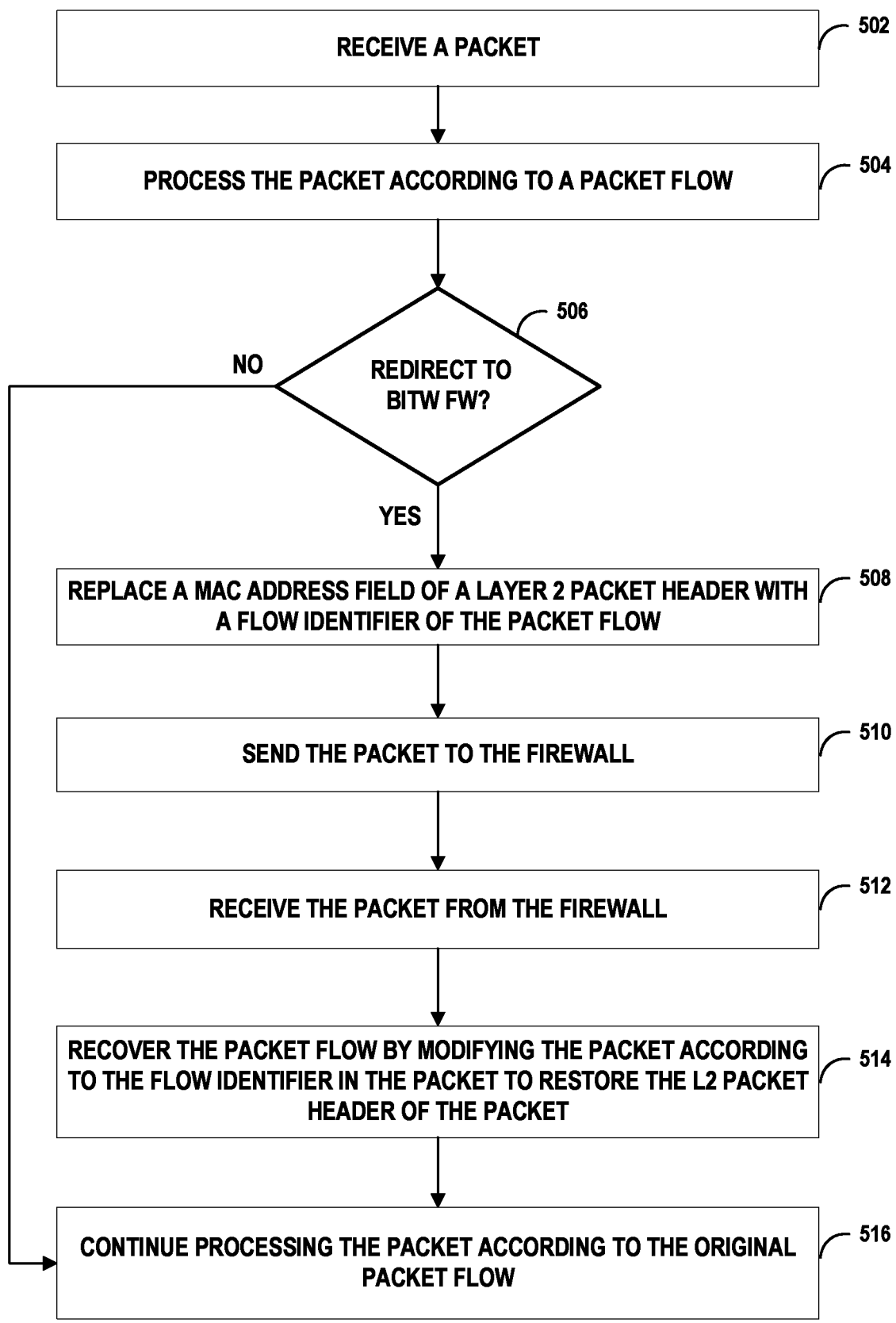
FIG. 5 is a flowchart illustrating an example operation in accordance with the techniques of the disclosure.

FIG. 5 is a flowchart illustrating an example operation in accordance with the techniques of the disclosure. For convenience, FIG. 5 is described with respect to FIGS. 1-2.

In the example of FIG. 5, a router (e.g., virtual router 13A) receives a packet (502). In one example, a virtual machine hosting an application may send a packet destined for another virtual machine or to IP fabric 20. In this example, virtual router 13A may receive the packet via a virtual machine interface of virtual router 13A. In another example, virtual router 13A may receive a packet from IP fabric 20 and destined for a virtual machine. In this example, the router may receive the packet via an IP fabric interface of virtual router 13A.

In response to receiving the packet, the router processes the packet according to a packet flow (504). For example, a router may use a flow key (e.g., based on the five-tuple of the packet) to hash into a flow table. In some instances, the action associated with the packet flow may be to redirect the packet to a firewall configured as a bump-in-the-wire, e.g., BITW firewall 11A (506).

If the router determines that the packet is not to be redirected to BITW firewall 11A ("NO" of 506), virtual router 13A may continue processing the packet according to the original packet flow (516). If the router determines that the packet is to be redirected to BITW firewall 11A ("YES" of 506), virtual router 13A may replace a MAC address field of an L2 header of the packet with a flow identifier of the packet flow (508). In some examples, virtual router 13A may redirect the packet to a specific interface of BITW firewall 11A. As one example, virtual router 13A may redirect the packet to a left interface of the BITW firewall if a flag of a flow entry is set to the left interface of BITW firewall 11A. In this example, the left interface operates as an input interface and the right interface operates as an output interface for BITW firewall 11A. As another example, virtual router 13A may redirect the packet to a right interface of BITW firewall 11A if a flag of the flow entry is set to the right interface of the BITW firewall. In this example, the right interface operates as an input interface and the left interface operates as an output interface for BITW firewall 11A.

In some examples, the flag of a flow entry is set to a left interface if virtual router 13A receives the packet via a source virtual machine interface (VMI) and the destination of the packet is a destination VMI, and if the source virtual router interface (vif) index is less than the destination vif index. If the source vif index is not less than the destination vif index, virtual router 13A sets the flag to the right interface of BITW firewall 11A. The flag of a flow entry is set to the left interface if the packet enters virtual router 13A via a source VMI and the destination of the packet is IP fabric 20.

In the examples in which virtual router 13A is configured to send the packet to the left interface of BITW firewall 11A, virtual router 13A encodes a flow identifier of the packet flow in the source MAC address field of the L2 header of the packet. In some examples, if an L3 VPN is implemented, virtual router 13A uses the MAC address of BITW firewall 11A in the destination MAC address field of the L2 header. Alternatively, if an L2 VPN is implemented, virtual router 13A leaves the destination MAC address field of the L2 header unchanged.

In some examples, in addition to encoding the flow identifier in the source MAC address field of the L2 header, virtual router 13A encodes a bit in the source MAC address field to indicate the packet source is from a virtual machine interface, e.g., "FROM_VMI" bit.

In another example, when virtual router 13A receives a packet via its fabric interface (e.g., to IP fabric 20), where the packet is destined for a virtual machine interface of virtual router 13A. In this example, virtual router 13A may redirect the packet to a right interface of BITW firewall 11A. For example, the flag of a flow entry is set to the right interface if the packet enters virtual router 13A via a fabric interface and the destination of the packet is to the virtual machine interface.

In some examples, if the virtual router is configured to send the packet to the right interface of BITW firewall 11A, virtual router 13A encodes a flow identifier in the destination MAC address field of the L2 header of the packet. If the incoming packet matches an IP address family next hop, virtual router 13A uses a Virtual Router Redundancy Protocol (VRRP) MAC address in the source MAC address field of the L2 header. If the incoming packet matches a bridge address family next hop, virtual router 13A leaves the source MAC address field of the L2 header unchanged.

In some examples, in addition to encoding the flow identifier in the destination MAC address filed of the L2 header, virtual router 13A encodes a bit in the destination MAC address field to indicate the packet source is from the IP fabric, e.g., "FROM_FABRIC" bit.

Virtual router 13A sends the packet to BITW firewall 11A (510). BITW firewall 11A receives the packet via a first interface, processes the packet with one or more policies, and returns the packet to virtual router 13A via its second interface. Virtual router 13A receives the packet from BITW firewall 11A (512) and in response to receiving the returned packet from BITW firewall 11A, virtual router 13A uses the flow identifier to recover the original packet flow of the packet by modifying the packet according to the flow identifier in the packet to restore the L2 packet header of the packet (514).

For example, if virtual router 13A receives the returned packet via the right interface of BITW firewall 11A, virtual router 13A uses the flow identifier in the source MAC address field as a flow index to recover the original flow. For example, virtual router 13A may determine the original flow from the flow identifier. The flow (that was generated for the packet when the packet was originally received by the virtual router) includes interfaces (e.g., virtual router interface (vif), virtual machine interface (VMI), next-hops, IP-to-MAC pairs, and other information. Using the original flow that was recovered from the flow identifier, virtual router 13A may determine the source VMI from which the virtual router 13A originally received the packet. Using the source VMI, virtual router 13A may determine the original source MAC address of the packet. Virtual router 13A restores the original source MAC address from a flow key next hop to the virtual router 13A interface (e.g., vif) using the source IP address of the flow. Virtual router 13A restores the packet header with the original source MAC address and may continue processing the packet according to the original packet flow (e.g., from before the packet was redirected to BITW firewall 11A) (516). Virtual router 13A skips the BITW firewall processing to avoid looping the packet back to BITW firewall 11A and continues with other actions associated with the flow (e.g., NAT, mirroring, service chaining, etc.).

In another example, if virtual router 13A receives the returned packet via a left interface of BITW firewall 11A, virtual router 13A uses the flow identifier in the destination MAC address field as a flow index to recover the original flow. For example, virtual router 13A may determine the original flow from the flow identifier. Using the original flow that was recovered from the flow identifier, virtual router 13A may determine the destination VMI that virtual router 13A is to use to send the packet onward toward the destination of the packet. Using the destination VMI, virtual router 13A may determine the original destination MAC address of the packet. If a FROM_FABRIC bit is set, in the case L2 VPNs, virtual router 13A restores the original destination MAC address from a flow key next hop to an interface of virtual router 13A (e.g., vif) using the destination IP address of the flow. If the FROM_VMI bit is set and the interface flag is set to the right interface, R, of BITW firewall 11A, the destination MAC address is restored from an IP-to-MAC map of a reverse flow key next hop to an interface of virtual router 13A (e.g., vif) using the destination IP address of the flow. Virtual router 13A restores the packet header with the original destination MAC address and may continue processing the packet according to the original packet flow (e.g., from before the packet was redirected to BITW firewall 11A) (516). Virtual router 13A skips the BITW firewall processing to avoid looping the packet back to BITW firewall 11A and continues with other actions associated with the flow (e.g., NAT, mirroring, service chaining, etc.).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method comprising:
   receiving, by a network device, a packet including a layer 2 (L2) packet header;
   determining, by the network device, that the packet matches a packet flow that is associated with an action to redirect the packet to a firewall configured as a bump-in-the-wire;
   prior to redirecting the packet to the firewall, modifying, by the network device, a Media Access Control (MAC) address field of the L2 packet header of the packet with a flow identifier of the packet flow;
   sending, by the network device, the packet including the flow identifier to the firewall;
   receiving, by the network device, the packet including the flow identifier returned from the firewall; and
   in response to receiving the packet including the flow identifier returned from the firewall, performing, by the network device, at least one of:
   determining, when the flow identifier is included in a source MAC address field of the L2 packet header, a first virtual machine interface (VMI) from which the network device received the packet from before the packet was sent to the firewall; or determining, when the flow identifier is included in a destination MAC address field of the L2 packet header, a second VMI by which the network device sends the packet to a destination of the packet;

determining, by the network device and based on determining the first VMI or the second VMI, the L2 packet header of the packet from before the packet was sent to the firewall; and in response to determining the L2 packet header of the packet from before the packet was sent to the firewall, modifying, by the network device, the packet including the flow identifier to restore the L2 packet header of the packet from before the packet was sent to the firewall.

2. The method of claim 1, further comprising: in response to modifying the packet including the flow identifier to restore the L2 packet header of the packet from before the packet was sent to the firewall, processing, by the network device, the packet according to the packet flow.

3. The method of claim 1, wherein receiving the packet comprises receiving the packet via the first VMI to a host device, wherein the packet is destined for an Internet Protocol (IP) fabric of the network device, wherein modifying the MAC address field of the L2 packet header of the packet with the flow identifier of the packet flow comprises modifying the source MAC address field of the L2 packet header, wherein sending the packet including the flow identifier to the firewall comprises sending the packet including the flow identifier to a first interface of the firewall configured to receive the packet including the flow identifier as an input, wherein receiving the packet including the flow identifier returned from the firewall comprises receiving the packet including the flow identifier returned via a second interface of the firewall configured to output the packet including the flow identifier.

4. The method of claim 3, wherein the network device implements layer 3 virtual private networking (L3VPN), the method further comprising: modifying the destination MAC address field of the L2 packet header of the packet with a MAC address of the firewall.

5. The method of claim 3, wherein modifying the source MAC address field of the L2 packet header of the packet further comprises encoding a direction bit to indicate the packet is sourced from the virtual machine interface.

6. The method of claim 3, wherein modifying the packet including the flow identifier to restore the L2 packet header of the packet from before the packet was sent to the firewall comprises: determining, by the network device and based on the flow identifier, an original source MAC address of the packet from before the packet was sent to the firewall; and modifying, by the network device, the flow identifier in the source MAC address field of the L2 packet header of the packet with the original source MAC address.

7. The method of claim 1, wherein receiving the packet comprises receiving, from an Internet Protocol (IP) fabric, the packet via an IP fabric interface, wherein the packet is destined for the second VMI to a host device, wherein modifying the MAC address field of the L2 packet header of the packet with the flow identifier of the packet flow comprises modifying the destination MAC address field of the L2 packet header of the packet, wherein sending the packet including the flow identifier to the firewall comprises sending the packet including the flow identifier to a first interface of the firewall configured to receive the packet including the flow identifier as an input, wherein receiving the packet including the flow identifier returned from the firewall comprises receiving the packet including the flow identifier returned from the firewall via a second interface of the firewall configured to output the packet including the flow identifier.

8. The method of claim 7, wherein an address family of the packet is an Internet Protocol address, the method further comprising: modifying the source MAC address field of the L2 packet header of the packet with a Virtual Router Redundancy Protocol (VRRP) MAC address.

9. The method of claim 7, wherein modifying the destination MAC address field of the L2 packet header of the packet further comprises encoding a direction bit to indicate the packet is sourced from the IP fabric interface.

10. The method of claim 7, wherein modifying the packet including the flow identifier to restore the L2 packet header of the packet from before the packet was sent to the firewall comprises: determining, by the network device, an original destination MAC address of the packet from before the packet was sent to the firewall; and modifying, by the network device, the flow identifier in the destination MAC address field of the L2 packet header of the packet with the original destination MAC address.

11. A network device comprising:

a virtual machine interface to communicate packet flows with a host device; an

Internet Protocol (IP) interface to communicate the packet flows with an IP fabric; and one or more processors coupled to a memory device, wherein the one or more processors are configured to:

receive a packet including a layer 2 (L2) packet header;

determine that the packet matches a first one of the packet flows that is associated with an action to redirect the packet to a firewall configured as a bump-in-the-wire;

prior to redirecting the packet to the firewall, modify a Media Access Control (MAC) address field of the L2 packet header of the packet with a flow identifier of the first one of the packet flows;

send the packet including the flow identifier to the firewall;

receive the packet including the flow identifier returned from the firewall; and in response to receiving the packet including the flow identifier returned from the firewall, perform at least one of:

determine, when the flow identifier is included in a source MAC address field of the L2 packet header, a first virtual machine interface (VMI) from which the network device received the packet from before the packet was sent to the firewall; or determine, when the flow identifier is included in a destination MAC address field of the L2 packet header, a second VMI by which the network device sends the packet to a destination of the packet;

determine, based on determining the first VMI or the second VMI, the L2 packet header of the packet from before the packet was sent to the firewall; and in response to determining the L2 packet header of the packet from before the packet was sent to the firewall, modify the packet including the flow identifier to restore the L2 packet header of the packet from before the packet was sent to the firewall.

12. The network device of claim 11, wherein, to receive the packet, the one or more processors are configured to receive the packet via the first VMI, wherein the packet is destined for the IP fabric, wherein, to modify the MAC address field of the L2 packet header of the packet with the flow identifier of the first one of the packet flows, the one or more processors are configured to modify the source MAC address field of the L2 packet header, wherein, to send the packet including the flow identifier to the firewall, the one or more processors are configured to send the packet including the flow identifier to a first interface of the firewall configured to receive the packet including the flow identifier as an input, wherein, to receive the packet including the flow identifier returned from the firewall, the one or more processors are configured to receive the packet including the flow identifier returned from the firewall via a second interface of the firewall configured to output the packet including the flow identifier.

13. The network device of claim 12, wherein the network device implements layer 3 virtual private networking (L3VPN), the one or more processors further configured to: modify the destination MAC address field of the L2 packet header of the packet with a MAC address of the firewall.

14. The network device of claim 12, wherein, to modify the source MAC address field of the L2 packet header of the packet, the one or more processors are further configured to encode a direction bit to indicate the packet is sourced from the first VMI.

15. The network device of claim 12, wherein, to modify the packet including the flow identifier to restore the L2 packet header of the packet from before the packet was sent to the firewall, the one or more processors are configured to: determine, based on the flow identifier, an original source MAC address of the packet from before the packet was sent to the firewall; and modify, by the network device, the flow identifier in the source MAC address field of the L2 packet header of the packet with the original source MAC address.

16. The network device of claim 11, wherein, to receive the packet, the one or more processors are further configured to receive, from the IP fabric, the packet via the IP fabric interface, wherein the packet is destined for the second VMI, wherein, to modify the MAC address field of the L2 packet header of the packet with the flow identifier of the first one of the packet flows, the one or more processors are configured to modify the destination MAC address field of the L2 packet header of the packet, wherein, to send the packet including the flow identifier to the firewall, the one or more processors are configured send the packet including the flow identifier to a first interface of the firewall configured to receive the packet including the flow identifier as an input, and wherein, to receive the packet including the flow identifier returned from the firewall, the one or more processors are configured to receive the packet including the flow identifier returned from the firewall via a second interface of the firewall configured to output the packet including the flow identifier.

17. The network device of claim 16, wherein an address family of the packet is an IP address, the one or more processors are further configured to: modify the source MAC address field of the L2 packet header of the packet with a Virtual Router Redundancy Protocol (VRRP) MAC address.

18. The network device of claim 16, wherein, to modify the destination MAC address field of the L2 packet header of the packet, the one or more processors are further configured to encode a direction bit to indicate the packet including the flow identifier is sourced from the IP fabric interface.

19. The network device of claim 16, wherein, to modify the packet including the flow identifier to restore the L2 packet header of the packet from before the packet was sent to the firewall, the one or more processors are configured to: determine an original destination MAC address of the packet from before the packet was sent to the firewall; and modify, by the network device, the flow identifier in the destination MAC address field of the L2 packet header of the packet with the original destination MAC address.

20. A computing device comprising:
a memory; and
one or more processors coupled to the memory, wherein the one or more processors are configured to:
instantiate a plurality of virtual execution elements, wherein a first virtual execution element is configured to provide an execution environment for one or more application workloads, and wherein a second virtual execution element is configured as a firewall configured as a bump-in-the-wire;
attach a virtual network interface to the plurality of virtual execution elements to enable packetized communications by the plurality of virtual execution elements on a virtual network; and
instantiate a virtual router configured to:
receive a packet including a layer 2 (L2) packet header;
determine that the packet matches a first one of the packet flows that is associated with an action to redirect the packet to a firewall configured as a bump-in-the-wire;
prior to redirecting the packet to the firewall, modify a Media Access Control (MAC) address field of the L2 packet header of the packet with a flow identifier of the first one of the packet flows;
send the packet including the flow identifier to the firewall; receive the packet including the flow identifier returned from the firewall; and
in response to receiving the packet including the flow identifier returned from the firewall, perform at least one of:
 determine, when the flow identifier is included in a source MAC address of the L2 packet header, a first virtual machine interface (VMI) from which the computing device received the packet from before the packet was sent to the firewall; or
 determine, when the flow identifier is included in a destination MAC address of the L2 packet header, a second VMI by which the computing device sends the packet to a destination of the packet;
determine, based on determining the first VMI or the second VMI, the L2 packet header of the packet from before the packet was sent to the firewall; and
in response to determining the L2 packet header of the packet from before the packet was sent to the firewall, modify, based on the flow identifier, the packet to restore the L2 packet header of the packet from before the packet was sent to the firewall.

* * * * *